US005897938A

United States Patent [19]

Shinmoto et al.

[11] Patent Number: 5,897,938

[45] Date of Patent: Apr. 27, 1999

[54] LASER MARKING ARTICLE AND LASER MARKING METHOD

[75] Inventors: Masaki Shinmoto; Shoiti Hayashibara, both of Yono; Mitsuyo Nishitoh, Yokohama, all of Japan

[73] Assignee: Nippon Kayaku Kabushiki Kaisha, Tokyo, Japan

[21] Appl. No.: 08/778,177

[22] Filed: Jan. 2, 1997

[30] Foreign Application Priority Data

Jan. 8, 1996 [JP] Japan .................................... 8-017006

[51] Int. Cl.[6] ........................................................ B32B 7/12

[52] U.S. Cl. ......................... 428/354; 428/343; 428/40.9; 428/203

[58] Field of Search .............................. 428/40, 203, 354, 428/343, 480, 411.1, 533, 423.1, 42.3, 195, 204, 353, 488.4, 356; 346/135.1; 503/200; 430/945

[56] References Cited

FOREIGN PATENT DOCUMENTS

| | | |
|---|---|---|
| 0 321 091 | 6/1989 | European Pat. Off. . |
| 0 419 377 | 3/1991 | European Pat. Off. . |
| 0 607 597 | 7/1994 | European Pat. Off. . |
| 63-205291 | 8/1988 | Japan . |
| 1-267092 | 10/1989 | Japan . |
| 7-96673 | 4/1995 | Japan . |
| 95/24317 | 9/1995 | WIPO . |

OTHER PUBLICATIONS

Patent Abstracts Of Japan vol. 018, No. 292 (M–1615), Jun. 3, 1994 & JP06055853A (Murata MFG Co., Ltd), Mar. 1, 1994 *Abstract.

Copy of the European Search Report dated May 12, 1997.

*Primary Examiner*—Merrick Dixon
*Attorney, Agent, or Firm*—Nields, Lemack & Dingman

[57] ABSTRACT

The present invention relates to a laser marking article having two or more layers of thin films on the surface thereof, wherein one of the layers other than the outermost layer is a thin film made of a laser marking ground composition containing a laser beam-absorbing whitish inorganic compound powder and a binder as essential ingredients, and to a laser marking method comprising irradiating said laser marking article with a laser beam.

According to the present invention, a vivid white-colored mark can be formed on the surface of an article even in case of low-energy laser irradiation or even in case of high-speed marking.

8 Claims, No Drawings

LASER MARKING ARTICLE AND LASER MARKING METHOD

BACKGROUND OF THE INVENTION

1. Field of the Invention

The present invention relates to articles to be marked by laser marking and method for laser marking.

2. Prior Art

In the recent years, laser marking method is employed in various fields including electronic parts such as IC, resistors, condensers, inductors and the like, electric parts such as relays, switches, connectors, printed circuit boards and the like, housings of electric appliances, automobile parts, mechanical parts, cables, sheets, packaging sheets, cards, containers of foodstuffs and medical drugs, caps and labels of containers, etc. in order to mark letters or symbols denoting the name of maker, the name of article, the date of manufacture, the lot number, etc. on the surface of the articles on real time, because laser marking method enables a high-speed fine marking. As the procedure of laser marking, there is known a method of irradiating a laser onto the coating film formed on a substrate surface, eliminating the coating film of the irradiate region, and thereby forming a contrast between the laser-irradiated region and laser-unirradiated region of the substrate.

The prior method, however, is disadvantageous in that, if a high energy laser (for example, a laser of 3 $J/cm^2$) is irradiated with the aim of forming a vivid mark, a long period of time is necessary for attaining such a high energy and the equipment therefor is expensive. Further, in case of low-strength articles such as paper, the substrate is destroyed in the laser-irradiated region and thereby the commercial value is deteriorated. The pulse type lasers is disadvantageous in that the irradiated area becomes smaller, as it is necessary to enhance an energy density in the irradiated region, owing to the low output. Although such a problem may be overcome by using a low-energy laser (for example, a laser of 1.5 $J/cm^2$ or less), vividness of the mark is lost under such a condition. The object of the present invention consists in developing a laser marking article on which a vivid white-colored mark can be formed even in case of low-energy laser irradiation or even in case of high-speed marking.

SUMMARY OF THE INVENTION

The present inventors have conducted extensive studies with the aim of solving the above-mentioned problems. As a result, the present invention has been accomplished. Thus, the present invention relates to:

(1) a laser marking article having two or more thin layers on the surface thereof, wherein one of the layers other than the outermost layer is a thin film made of a laser marking ground composition containing a laser beam-absorbing whitish inorganic compound powder and a binder as essential ingredients;

(2) a laser marking article according to item (1), wherein said article is a label;

(3) a laser marking article according to item (1), wherein said thin film made of a laser marking ground composition has a thickness of 1 to 5 $\mu$m;

(4) a laser marking article according to item (1), wherein said whitish inorganic compound powder is polyvalent metal hydroxides, organoaluminum compounds, borates, silicates, phosphates or oxalates.

(5) a laser marking article according to item (1), wherein said whitish inorganic compound powder has an absorption peak of infrared absorption spectrum in the range of from 900 to 1,000 $cm^{-1}$;

(6) a laser marking article according to item (5), wherein said inorganic compound having an absorption peak of infrared absorption spectrum in the range of from 900 to 1,000 $cm^{-1}$ is aluminum hydroxide, a mica or talc;

(7) a laser marking article according to item (1), wherein said binder is a solvent soluble binder;

(8) a laser marking article according to item (1), wherein the proportion of the laser beam-absorbing whitish inorganic compound powder is 5 to 95% by weight and the proportion of the binder is 2 to 70% by weight, both to the total solid component in the laser marking ground composition;

(9) a method for laser marking an article which comprises irradiating a laser marking article according to item (1) with a laser beam;

(10) a method for laser marking according to item (9), wherein said laser beam is an infrared laser;

(11) a method for laser marking according to item (10), wherein said infrared laser is a far infrared laser;

(12) a method for laser marking according to item (11), wherein the laser beam has an energy of from 0.1 to 1.5 $J/cm^2$; and

(13) a laser marking ground composition containing, as essential ingredients, a laser beam-absorbing whitish inorganic compound powder and a binder.

DETAILED DESCRIPTION OF THE INVENTION

The laser marking article of the present invention is an article having two- or more-layered thin films on the surface thereof, wherein one of the layers other than the outermost layer is a thin film layer made of a laser marking ground composition containing a laser beam-absorbing whitish inorganic compound powder and a binder as essential ingredients. The laser marking ground composition contains a laser beam-absorbing whitish inorganic compound powder and a binder as essential ingredients. The composition preferably has a whitish color of pastel tone such as white, reddish white, bluish white, yellowish white, blackish white, etc. By coating this composition onto a substrate to form a ground layer, then providing thereon a colored or colorless layer to obtain an article of the present invention, and irradiating laser thereto, a whitish mark can be formed on the article.

The laser beam-absorbing whitish inorganic compound powder which can be used in the present invention is not particularly limited, so far as it has an ability to absorb laser beam and can give a whitish color upon irradiation with laser beam. From the viewpoint of use as a ground, however, the compound powder preferably has a whitish color of pastel tone such as white, reddish white, bluish white, yellowish white, blackish white, etc. As the material constituting the compound powder, polyvalent metal hydroxides, organoaluminum compounds, borates, silicates, phosphates, oxalates and the like can be referred to. The term "whitish color" includes those colors which can be said to be whitish when viewed on the whole powder material but give a colorless transparency or a colored transparency when viewed on individual particle, too. Mean particle diameter of the powder is usually 2 $\mu$m or less, and particularly preferably 1 $\mu$m or less, as measured with Shimadzu, Centrifugal Sedimentation Type Particle Size Distribution Meter Model SA-CP2.

As examples of the polyvalent metal hydroxide, those forming a white-colored oxide upon irradiation with laser beam such as aluminum hydroxide, calcium hydroxide and the like can be referred to. As examples of the organoaluminum compound, acetylacetone-aluminum and the like can be referred to. As the borates, metallic borates such as zinc borate, calcium borate, magnesium borate, lithium borate, aluminum borate, sodium borate, manganese borate, barium borate and the like can be referred to. Said borates may contain combined water or be anhydrous. As the silicates, there can be referred to natural micas such as muscovite, phlogopite, biotite, sericite and the like, synthetic micas such as fluorophlogopite, fluorotetrasilicate mica and the like, zirconium silicate, calcium silicate, aluminum silicate, wollastonite, bentonite, silica, hydrous silica, talc, kaolinite, clay, siliceous sand, blast furnace slag, diatomaceous earth, and various natural silicates belonging to divine group, garnet group, calcium pyroxene group, quasi-pyroxene group, amphibole group, serpentine group, feldspar group and quasi-feldspar group. As the phosphates, zinc phosphate, calcium primary phosphate, calcium secondary phosphate, calcium tertiary phosphate, magnesium primary phosphate, magnesium secondary phosphate, magnesium tertiary phosphate, lithium primary phosphate, lithium secondary phosphate, lithium tertiary phosphate, aluminum phosphate, sodium primary phosphate, sodium secondary phosphate, sodium tertiary phosphate, potassium primary phosphate, potassium secondary phosphate, potassium tertiary phosphate, manganese phosphate, ammonium manganese phosphate, zirconyl phosphate, barium phosphate, hydroxyapatite and the like can be referred to. As the oxalates, calcium oxalate, magnesium oxalate and the like can be referred to. Of these compounds, preferred are aluminum hydroxide, zinc borate, calcium phosphates, micas, silica, talc, kaolinite, clay, calcium hydroxide, and magnesium oxalate. Of these compounds, particularly preferred are aluminum hydroxide, micas and talc. These compounds may be used in the form of a mixture of two or more, if desired.

If desired, the laser beam-absorbing whitish inorganic compound powder used in the present invention may be an inorganic compound having an absorption peak of infrared absorption spectrum in the range of from 900 to 1,000 $cm^{-1}$. Such inorganic compounds can be used regardless of the intensity of absorption, so far as the absorption peak thereof is in the above-mentioned range, and are not particularly limited so far as they give a whitish color upon irradiation with laser beam. However, from the viewpoint that the composition of the present invention is used as a ground, those having a whitish color of pastel tone such as white, reddish white, bluish white, yellowish white, blackish white, etc. are preferred. Concrete examples of the laser beam-absorbing whitish inorganic compound powder include aluminum hydroxide, wollastonite, bentonite, hydrous silica, calcium silicate, talc, kaolinite, clay, mica and the like. Of these inorganic compounds, aluminum hydroxide, micas and talc are particularly preferred. These inorganic compounds may be used in the form of a mixture of two or more, if desired. The term “whitish color” includes those colors which can be said to be whitish when viewed on the whole powder material and give a colorless transparency or a colored transparency when viewed on individual particle, too.

The laser beam-absorbing whitish inorganic compound powders used in the present invention are preferably those in which, when a transparent thin layer is coated on a layer containing said compound powder, the substrate color before being coated with the transparent thin layer can directly be seen through or, in other words, inorganic compounds having so small an opacifying power as useless as a pigment. Such an inorganic compound is not particularly limited so far as it gives a whitish color upon irradiation with laser beam. From the viewpoint that the composition of the present invention is for use as a ground, however, those having a whitish color of pastel tone such as white, reddish white, bluish white, yellowish white, blackish white, etc. are preferred. Concrete examples of the compound powder include aluminum hydroxide, micas and talc. The term “whitish color” includes those colors which can be said to be whitish when viewed on the whole powder material and give a colorless transparency or a colored transparency when viewed on individual particle, too.

The binders which can be used in the present invention include water-soluble or water-dispersed binders and solvent soluble binders. The water-soluble or water-dispersed binders are put to use after dissolution or dispersion of binder in water. Concrete examples of the water-soluble or water-dispersed binder include starches, hydroxyethyl cellulose, methyl cellulose, carboxymethyl cellulose, gelatin, casein, gum arabic, polyvinyl alcohol, styrene-maleic anhydride copolymer salt, styrene-acrylic acid copolymer salt, styrene-butadiene copolymer emulsion, acrylic ester-acrylic acid copolymer, methacrylic ester-acrylic acid copolymer, acrylic ester-methacrylic acid copolymer, methacrylic ester-methacrylic acid copolymer, acrylic acid copolymers, styrene-acrylic acid-methacrylic acid copolymer, polyamide resins, polybutyral resins, polyvinylbutyral resin, nitrocellulose resins, acryl resins, vinyl chloride-vinyl acetate copolymer resins, urethane resins, petroleum resins, chlorinated rubber resin, cyclized rubber resin, alkyd resins, and the like. Of these water-soluble or water-dispersed binders, preferred are polyvinyl alcohol, styrene-maleic anhydride copolymer salt, styrene-acrylic acid copolymer salt, acryl resins, polyamide resins and nitrocellulose resins. If desired, these binders may be used in the form of a mixture of two or more. If desired, these binders may be used as a dispersion stabilizer.

As the solvent soluble binder, those materials which are soluble in organic solvent and can form a film are used. Concrete examples of the solvent soluble binder include polyvinyl chloride, acrylic resin, acryl-styrene copolymer, polyester resin, polycarbonate resin, polyurethane resin, polybutyral resin, epoxy resin, furan resin, polyamide resin, polyvinyltoluene copolymers, rosin ester resin and the like.

The binder is appropriately selected according to the quantity of laser beam energy used in the treatment. For example, when the energy is 1.0 $J/cm^2$, a solvent soluble binder exhibiting a high binding force should be used for the purpose of preventing the breakage of the laser marking ground composition layer, and acryl resin and polyamide resin are particularly preferable. When the energy is 0.6 $J/cm^2$, for example, the solvent soluble binder and the water-soluble or water-dispersed binder are both usable. When importance is attached to the influence to environments, aqueous binders using no organic solvent are preferable to solvent type ones.

The proportions of the above-mentioned ingredients in the laser marking composition are in the following ranges. Thus, proportion of the laser beam-absorbing whitish inorganic compound powder is preferably 5–95% by weight, more preferably 10–90% by weight, and further preferably 20–85% by weight, based on the total solid component in the composition. Proportion of the binder is preferably 2–70% by weight, more preferably 5–50% by weight, and further preferably 10–40% by weight on the same basis as above. In the composition of the present invention, the ratio of the laser beam-absorbing whitish inorganic compound to the binder is not particularly limited. Generally speaking, however, the binder is used in an amount of preferably 0.05–2 parts by weight and more preferably 0.1–1 part by weight, per part by weight of the laser beam-absorbing whitish inorganic compound powder.

In putting the composition of the present invention to use, the composition is coated onto a substrate. For the purpose of facilitating the coating onto the substrate, a variety of additives may be added to the composition. Based on the total solid components in the composition, the amount of the additives is 0.1–40% by weight, and preferably about 0.3–25% by weight. Examples of said additives include anionic dispersants such as sodium dioctyl sulfosuccinate, sodium dodecylbenzenesulfonate, sodium salt of lauryl alcohol sulfate, fatty acid metal salts and the like; cationic dispersants such as oleylamine acetate, aminopropylamine oleate, tetraalkylammonium salts and the like; non-ionic dispersants such as polyethylene glycol derivatives, polyhydric alcohol derivatives, higher fatty acid esters and the like; and amphoteric dispersants such as amino acids, betain compounds and the like; as well as anti-foaming agents of silicone type, higher alcohol type and fluorine type; light stabilizers of triazole type, phenol type and amine type; fluorescent dyes represented by stilbene type and coumarin type of ones; slippers represented by higher fatty acids and salts thereof, carnauba wax, polyethylene wax and fluorine resin; fillers other than the inorganic compounds usable in the present invention; and opacifying agents represented by titanium dioxide, calcium carbonate and alumina. These assistants are not particularly limited, but a variety of commercially available assistants may be appropriately selected.

The substrate onto which the composition of the present invention is to be coated is not particularly limited, and paper, synthetic resins, metals and the like may be used. Sheet-form substrates are preferable. For example, paper, synthetic paper, synthetic resin film, metal vapor-deposited paper, metal vapor-deposited synthetic paper, metal vapor-deposited film and the like may be appropriately used in accordance with use.

The composition of the present invention can be obtained by mixing together the above-mentioned laser beam-absorbing whitish inorganic compound powder and the above-mentioned binder and, if desired, the above-mentioned additives. In mixing together these ingredients, water and/or an organic solvents may be used as dispersion medium. Examples of said organic solvents include alcohols such as methanol, ethanol, propyl alcohol, isopropyl alcohol, n-butyl alcohol, secbutyl alcohol, isobutyl alcohol, methyl cellosolve, ethyl cellosolve, butyl cellosolve and the like; carboxylic esters such as methyl acetate, ethyl acetate, propyl acetate, isopropyl acetate, butyl acetate, isobutyl acetate, amyl acetate, methyl propionate, ethyl propionate, methyl butyrate, ethyl butyrate, methyl benzoate, ethyl benzoate, dimethyl phthalate, diethyl phthalate, trimethyl trimellitate and the like; aromatic solvents such as benzene, toluene, xylene, ethylbenzene and the like; and glycol derivatives such as diethylene glycol dimethyl ether, diethylene glycol diethyl ether, propylene glycol dimethyl ether, propylene glycol diethyl ether, propylene glycol monomethyl ether acetate and the like. These mediums may be used in the form of a mixture of two or more, if desired.

The article of the present invention is not particularly limited, so far as the article is to be marked by means of laser beam. Examples of the article to be marked include label, packaging paper, packaging film, packaging materials such as packaging containers made of paper or plastics, and cans made of paper, plastics, metals or the like. The article of the present invention can be produced in the following manner, for example. Thus, there can be adopted a method of preparing a laser marking ground coating material containing the composition of the present invention by dispersing the ingredients constituting the composition of the present invention in a dispersion medium such as water and/or the above-mentioned organic solvents, and then dissolving or dispersing the binder in the dispersion medium, followed by coating the coating material thus obtained onto the substrate surface of the article of which surface may be subjected to a pretreatment if desired, so as to give a coating thickness in dryness of about 1–15 μm preferably, and drying the coating to form a layer of the composition of the present invention, and thereafter forming other layers thereon. Otherwise, it is also possible to form a layer of pretreating agent, such as corrosion-proofing agent or the like, before coating the composition of the present invention. The proportion of the composition of the present invention in the laser marking ground coating material is 10–95% by weight, preferably 15–90% by weight, and further preferably about 20–90% by weight. As the dispersion medium, organic solvents are preferable and esters such as ethyl acetate and the like are more preferable, from the viewpoint of solubility of binder. When an importance is attached to the influence on environments, water is preferable as the dispersion medium.

As said "other layers" to be formed on the layer formed from the composition of the present invention, a colored layer, a transparent thin film layer, and the like can be referred to, for example. As said colored layer, a printing ink layer can be referred to, for example. As said transparent thin film layer, layers of various film-forming high polymeric compounds such as water-soluble or water-dispersed and/or solvent soluble OP varnish, polyvinyl alcohol, acryl emulsion and the like can be referred to, for example. The transparent thin film layer may be colorless or colored for some purposes, so far as the layer is transparent. If the transparent thin film layer is provided as an outermost layer, the layer mainly functions as a protecting layer. When a transparent thin film layer is provided between other layers, the transparent thin film layer is mainly used for the purpose of binding together the layers located thereover and thereunder. If desired, said other layers may be used in the form of two- or more-layered multilayer structure, such as a structure consisting of a colored layer and a protecting layer formed on the colored layer, etc. Each of these layers has a thickness of 5 μm or less, and preferably about 0.5 to about 4 μm.

If desired, another layer may be provided under the layer formed from the composition of the present invention, in accordance with purpose. As examples of said "another layer", corrosion-proofing layer, colored layer, transparent thin film layer and the like can be referred to. As the colored layer, printing ink layer and aluminum vapor deposited layer and the like can be referred to. When a transparent thin film layer is provided, the transparent thin film layer is used mainly for the purpose of binding together the layers located thereover and thereunder. Although thickness of these layers varies depending on the purpose of providing the layers, it is preferable that each layer has a thickness of 10 μm or less, and more preferably about 0.5 to about 8 μm.

The method of the present invention can be put into practice, for example, by coating a laser marking ground coating material comprising the composition of the present invention onto a substrate, drying the coating to form a layer comprising the composition of the present invention, subsequently forming thereon other layers to obtain an article of the present invention, and thereafter irradiating a laser beam to the article.

The coating material used herein can be prepared by dispersing the above-mentioned laser beam-absorbing whitish inorganic compound powder in water or organic solvent as a dispersion medium by the use of a dispersing equipment such as ball mill, attritor, sand grinder or the like to obtain a dispersion of said compound powder, and subsequently adding thereto a binder dissolved or dispersed in water or an organic solvent. After being dispersed, the laser beam-absorbing compound used in the present invention has a mean particle diameter of usually 2 μm or less and preferably 1 μm or less. The additives other than the inorganic compound are also added after being dispersed with various dispersing equipment, and the mean particle diameter thereof is usually 2 μm or less and preferably 1 μm or less.

The procedure for coating the laser marking ground coating material onto a substrate is not particularly limited, but the coating can be practiced according to the hitherto known techniques. For example, when a coating fluid is applied onto a support, a coating device such as air knife coater, blade coater, gravure printing machine and the like can be used. Particularly when the composition of the present invention is used in the field of label printing, gravure printing process is preferred. Although the thickness of coating film layer obtained by drying the coated layer is not particularly limited, it is preferably in the range of from 1 to 15 μm. Particularly when the composition of the present invention is used in the field of label, thickness of the coating film layer is more preferably 1 to 5 μm and further preferably about 2 to 4 μm. A surface which has been coated with the ground composition of the present invention gives a white or whitish color. When the layer of the ground composition of the present invention has a thickness of 5 μm or less and particularly 1 to 4 μm and a transparent thin film layer is formed thereon, there can be exhibited a characteristic feature that the color of the substrate surface before being coated with the ground composition can be directly seen as it is. As compounds for exhibiting such a characteristic feature, aluminum hydroxide, micas and talc are used preferably.

As the laser beam to be irradiated, pulse type lasers having an output of 1.5 J/cm$^2$ or less, preferably 0.1 to 1.5 J/cm$^2$, more preferably 0.2 to 1.2 J/cm$^2$ and further preferably 0.3 to 1.1 J/cm$^2$ and scanning type lasers having an output of 5 to 100 W, preferably 10 to 90 W, and further preferably 15 to 85 W are preferably used. The lasers which can be used include carbon dioxide gas laser, YAG laser, excimer laser and the like. Infrared lasers and particularly far infrared lasers such as TEA type carbon dioxide gas laser and the like are preferred.

According to the present invention, a mark of vivid whitish color can be obtained even in case of low-energy laser irradiation or in case of high-speed laser marking. If a colored layer is provided on the surface coated with the ground composition of the present invention, a mark of more vivid whitish color can be obtained. A surface which has been coated with the ground composition of the present invention gives a white or whitish color. When the layer of the ground composition of the present invention has a thickness of 5 μm or less and particularly 1 to 4 μm and a transparent thin film layer is formed thereon, there can be exhibited a characteristic feature that the color of the substrate surface before being coated with the ground composition can be directly seen as it is. When the surface before being coated gives a color other than white, a mark of more vivid white color can be obtained without providing a colored layer on the surface coated with the ground composition of the present invention.

DESCRIPTIONS OF THE PREFERRED EMBODIMENTS

Next, the present invention is explained more concretely with reference to examples. The invention is by no means limited by these examples. In the descriptions presented below, the term "parts" means parts by weight.

REFERENTIAL EXAMPLE 1

Preparation of a Dispersion of Laser Beam-absorbing Compound

A mixture consisting of 55 parts of aluminum hydroxide, 16.7 parts of 40% aqueous solution of acrylic dispersing agent and 28.3 parts of water was subjected to a dispersing treatment for 2 hours by the use of a sand grinder to prepare an aluminum hydroxide dispersion (A) having a mean particle diameter of about 1 μm.

REFERENTIAL EXAMPLE 2

Preparation of a Dispersion of Laser Beam-absorbing Compound

A mixture consisting of 30 parts of talc, 16.7 parts of 40% aqueous solution of acrylic dispersing agent and 53.3 parts of water was subjected to a dispersing treatment for 2 hours by the use of a sand grinder to obtain a talc dispersion (B) having a mean particle diameter of about 1 μm.

REFERENTIAL EXAMPLE 3

Preparation of a Mixed Dispersion of Two Laser Beam-absorbing Compounds

A mixture consisting of 55 parts of toluene, 40 parts of aluminum hydroxide, 3 parts of talc and 2 part of Homogenol L-1820 (20% solution of nonionic surfactant in toluene, manufactured by Kao Corp.) was subjected to a dispersing treatment for 2 hours by the use of a sand grinder to obtain dispersion (C) having a mean particle diameter of about 1 μm.

REFERENTIAL EXAMPLE 4

Solvent Dispersion

A mixture consisting of 75 parts of ethyl acetate and 25 parts of aluminum hydroxide was subjected to a dispersing treatment for 2 hours by the use of a sand grinder to obtain dispersion (D) having a mean particle diameter of about 1 μm.

REFERENTIAL EXAMPLE 5

Solvent Dispersion

A mixture consisting of 75 parts of ethyl acetate and 25 parts of mica was subjected to a dispersing treatment for 2 hours by the use of a sand grinder to obtain dispersion (E) having a mean particle diameter of about 1 μm.

REFERENTIAL EXAMPLE 6

Solvent Dispersion

A mixture consisting of 75 parts of ethyl acetate and 25 parts of talc was subjected to a dispersing treatment for 2 hours by the use of a sand grinder to obtain dispersion (F) having a mean particle diameter of about 1 μm.

EXAMPLE 1

A coating material of the marking ground composition of the present invention was prepared by mixing 90 parts of dispersion (A) with 10 parts of an acrylic aqueous binder having a binder content of 40% by weight (a copolymer type binder obtained by copolymerizing n-butyl acrylate, methyl methacrylate, 2-ethylhexyl acrylate, acrylic acid, styrene, etc.). Then, the coating material was coated onto an aluminum vapor-deposited paper by means of No. 3 bar coater so as to give a film thickness, after dryness, of about 3–4 μm. After drying the coating at 60° C. for 5 minutes, OP varnish was coated thereon by the use of No. 3 bar coater so as to give a coating film thickness of 3 μm to prepare a test piece of laser marking article of the present invention. The test piece gave a white color before being coated with the OP varnish, which turned to the same silver color as the color of aluminum vapor-deposited paper after being coated with OP varnish. When one shot of laser beam was irradiated to the test piece at an energy of 0.6 J/cm$^2$ by means of a pulse type carbon dioxide gas laser (BLAZAR 6000, manufactured by Laser Technics Co.), a vivid white-colored mark was formed on the silver-colored ground.

EXAMPLE 2

A coating material of the marking ground composition of the present invention prepared by mixing together 80 parts of dispersion (A), 10 parts of dispersion (B) and 10 parts of acrylic aqueous binder as used in Example 1 was coated onto an aluminum vapor-deposited paper by the use of No. 3 bar coater so as to give a film thickness after dryness of about 3 to 4 μm. After drying the coating film at 60° C. for 5 minutes, an acrylate type OP varnish was coated further thereon so as to give a film thickness of about 2 μm to obtain a test piece of laser marking article of the present invention. The test piece gave a white color before being coated with the OP varnish, which turned to the same silver color as the color of the aluminum vapor-deposited paper when coated with the OP varnish. When irradiated with laser beam in the same manner as in Example 1, a vivid white-colored mark was formed on the silver-colored ground.

EXAMPLE 3

A coating material of marking ground composition of the present invention prepared by mixing together 50 parts of dispersion (C) and 10 parts of Highpearl M-7450E-40 (40% toluene solution of styrene-acrylic acid-methacrylic acid copolymer type binder, manufactured by Nemoto Kogyo K. K.) was coated on an aluminum vapor-deposited paper by the use of No. 3 bar coater so as to give a film thickness after dryness of about 3 to 4 μm. After drying the coating at 60° C. for 5 minutes, a nitrocellulose type OP varnish was coated further thereon by means of No. 3 bar coater so as to give a film thickness of about 3 μm and dried to prepare a test piece of laser marking article of the present invention. The test piece gave a white color before being coated with OP varnish, which turned to the same silver color as the color of the aluminum vapor-deposited paper when coated with OP varnish. The test piece was irradiated with one shot of laser beam at an energy of 0.6 J/cm$^2$ by means of a pulse type carbon dioxide gas laser (BLAZAR 6000, manufactured by Laser Technics Co.). As a result, a vivid white-colored mark was formed on the silver colored ground.

EXAMPLE 4

A coating material of the marking ground composition of the present invention prepared by mixing together 90 parts of dispersion (A) and 10 parts of an acrylic aqueous binder as used in Example 1 was coated onto an aluminum vapor-deposited paper by the use of No. 3 bar coater so as to give a film thickness after dryness of about 3 to 4 μm, and dried at 60° C. for 5 minutes. The test piece thus obtained was coated with a red-colored ink consisting of 10 parts of MH Red #22722M (red pigment, manufactured by Mikuni Shikiso Co.), 10 parts of Highpearl M-7450E-40 as used in Example 3 and 20 parts of toluene by the use of No. 3 bar coater so as to give a film thickness of about 3 μm, and dried. Further thereon was coated a nitrocellulose type OP varnish so as to give a film thickness of about 2 μm and dried. Thus, a test piece of the laser marking article of the present invention was obtained. The test piece was irradiated with one shot of laser beam at an energy of 1.0 J/cm$^2$ by means of a pulse type carbon dioxide gas laser. As a result, a vivid white-colored mark was formed on a red-colored background.

EXAMPLE 5

A coating material of the marking ground composition of the present invention prepared by mixing together 30 parts of dispersion (D) and 70 parts of a polyamide type binder (binder content 30%, a solution in ethyl acetate) was coated onto an aluminum vapor-deposited paper by the use of No. 3 bar coater so as to give a film thickness after dryness of about 3 to 4 μm, and dried at 60° C. for 5 minutes. Further thereon was coated a nitrocellulose type OP varnish so as to give a film thickness of about 2 μm. As a result, the test piece gave the same silver color as the color of the aluminum vapor-deposited paper. Then, the test piece was irradiated with laser beam in the same manner as in Example 1. As a result, a vivid white-colored mark was formed on the silver-colored ground.

EXAMPLE 6

A coating material of the marking ground composition of the present invention prepared by mixing together 30 parts of dispersion (E), 60 parts of an acrylic binder (binder content 40%, a solution in toluene, Paraloid B-11, manufactured by Rohm & Hass Co., Ltd.) and 10 parts of toluene was coated onto an aluminum vapor-deposited paper by the use of a bar coater so as to give a film thickness after dryness of about 3 to 4 μm and dried at 60° C. for 5 minutes. The test piece was coated with a red-colored ink consisting of 10 parts of MH Red #22722M (manufactured by Mikuni Shikiso Co.), 10 parts of acrylic binder (binder content 40%, a solution in toluene) as used above and 20 parts of toluene by the use of No. 3 bar coater so as to give a film thickness of about 3 μm and dried. Further thereon was coated a nitrocellulose type OP varnish so as to give a film thickness of about 2 μm and dried. Thus, a test piece of the laser marking article of the present invention was obtained. The test piece was irradiated with one shot of laser beam at an energy of 1.0 J/cm$^2$ by means of a pulse type carbon dioxide gas laser. As a result, a vivid white-colored mark was formed on a red-colored background.

EXAMPLE 7

A coating material of the marking ground composition of the present invention prepared by mixing together 30 parts of dispersion (F) and 70 parts of vinyl chloride type binder (binder content 40%, a solution in ethyl acetate, ZEST C150ML manufactured by Shin Daiichi Enbi Co., Ltd.) was coated onto an aluminum vapor-deposited paper by the use of No. 3 bar coater so as to give a film thickness after dryness of about 3 to 4 μm, and dried at 60° C. for 5 minutes. Further thereon, a nitrocellulose type OP varnish was coated so as to give a film thickness of about 2 μm. Thus, the test piece gave the same silver color as that of the aluminum vapor-deposited paper. When irradiated with a laser beam in the same manner as in Example 1, a vivid white-colored mark was formed on the silver-colored ground.

EXAMPLE 8

A coating material of marking ground composition of the present invention prepared by mixing together 15 parts of dispersion (D), 15 parts of dispersion (F) and 70 parts of a polyamide type binder (binder content 40%, a solution in ethyl acetate) onto an aluminum vapor-deposited paper by the use of No. 3 bar coater so as to give a film thickness after dryness of about 3 to 4 μm, and dried at 60° C. for 5 minutes. Further thereon was coated a nitrocellulose type OP varnish so as to give a film thickness of about 2 μm. Thus, the test piece gave the same silver color as the color of the aluminum vapor-deposited paper. When irradiated with a laser beam in the same manner as in Example 1, a vivid white-colored mark was formed on the silver-colored ground.

COMPARATIVE EXAMPLE 1

An aluminum vapor-deposited paper coated with the marking ground composition of the present invention in the same manner as in Example 1 was irradiated with one shot of laser beam at an energy of 1.0 $J/cm^2$ by means of a pulse type carbon dioxide gas laser. As a result, no vivid mark could be formed.

What is claimed is:

1. A laser marking article having a surface having two or more overlapping layers thereon, one of said at least two layers being an outermost layer with respect to said surface, wherein one of said at least two layers other than said outermost layer is a film made of a laser marking ground composition consisting essentially of a laser beam-absorbing whitish inorganic compound powder and a binder.

2. A laser marking article according to claim 1, wherein said article is a label.

3. A laser marking article according to claim 1, wherein said film made of the laser marking ground composition has a thickness of 1 μm to 5 μm.

4. A laser marking article according to claim 1, wherein said whitish inorganic compound powder is selected from the group consisting of polyvalent metal hydroxides, organoaluminum compounds, borates, silicates, phosphates or oxalates.

5. A laser marking article according to claim 1, wherein said whitish inorganic compound powder is an inorganic compound having an absorption peak of infrared absorption spectrum in the range of from 900 to 1,000 $cm^{-1}$.

6. A laser marking article according to claim 5, wherein said inorganic compound having an absorption peak of infrared absorption spectrum in the range of from 900 to 1,000 $cm^{-1}$ is aluminum hydroxide, a mica or talc.

7. A laser marking article according to claim 1, wherein said binder is a solvent soluble binder.

8. A laser marking article according to claim 1, wherein the proportion of the laser beam-absorbing whitish inorganic compound powder is 5% to 95% by weight and the proportion of the binder is 2% to 70% by weight, both based on the laser marking ground composition.

* * * * *